(12) United States Patent
Kruse

(10) Patent No.: US 11,009,008 B2
(45) Date of Patent: May 18, 2021

(54) CANOPY STRUCTURE AND A WIND TURBINE

(71) Applicant: Siemens Gamesa Renewable Energy A/S, Brande (DK)

(72) Inventor: Thomas Kruse, Skanderborg (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 16/280,425

(22) Filed: Feb. 20, 2019

(65) Prior Publication Data

US 2019/0271297 A1 Sep. 5, 2019

(30) Foreign Application Priority Data

Mar. 2, 2018 (EP) ..................................... 18159737

(51) Int. Cl.
*E04H 12/00* (2006.01)
*F03D 13/10* (2016.01)
*F03D 80/80* (2016.01)
*F03D 80/00* (2016.01)

(52) U.S. Cl.
CPC ............ *F03D 13/10* (2016.05); *F03D 80/00* (2016.05); *F03D 80/80* (2016.05); *F05B 2230/604* (2013.01); *F05B 2240/14* (2013.01)

(58) Field of Classification Search
CPC ........ F03D 13/10; F03D 1/0691; F03D 80/00; F03D 80/80; F05B 2240/14; Y02E 10/726
USPC ................................ 52/40; 415/213.1, 214.1
See application file for complete search history.

(56) References Cited

U.S. PATENT DOCUMENTS

| 2,602,199 A | * | 7/1952 | Kendall | ................... | E04F 10/08 52/77 |
| 2,791,010 A | * | 5/1957 | Schurger | ................. | E04F 10/08 52/78 |
| 3,218,772 A | * | 11/1965 | Martin | ................ | E04F 13/0864 52/508 |

(Continued)

FOREIGN PATENT DOCUMENTS

| CN | 204061065 U | 12/2014 |
| CN | 107740755 A | 2/2018 |

(Continued)

OTHER PUBLICATIONS

EP Search Report dated Aug. 23, 2018 for Application No. 18159737. 8.

(Continued)

*Primary Examiner* — Chi Q Nguyen
(74) *Attorney, Agent, or Firm* — Schmeiser, Olsen & Watts LLP

(57) ABSTRACT

Provided is a canopy structure for a nacelle of a wind turbine, including at least one side and a plurality of standard panels which all have the same length and the same width, wherein the at least one side is at least partly formed from the plurality of standard panels, and wherein each standard panel includes a flange which runs only along one edge of the standard panel. Advantageously, the canopy structure including the standard panels is able to reduce the need of a high number of different canopy parts. The amount of different types of molds or tools for producing the standard panels is reduced which leads to a more cost-effective production of the canopy structure.

14 Claims, 10 Drawing Sheets

(56) References Cited

U.S. PATENT DOCUMENTS

| | | | | |
|---|---|---|---|---|
| 3,992,839 | A * | 11/1976 | La Borde | E04B 2/721 52/275 |
| 4,187,661 | A * | 2/1980 | Poiry | E04G 23/02 52/514 |
| 5,975,615 | A * | 11/1999 | Showalter | B60J 1/06 280/DIG. 5 |
| 6,348,658 | B1 * | 2/2002 | Gutgsell | H02G 3/0418 174/66 |
| 6,550,216 | B1 * | 4/2003 | Ohanesian | E04C 2/20 52/537 |
| 6,581,337 | B1 * | 6/2003 | Skov | E04B 1/34315 52/79.5 |
| 7,918,632 | B2 * | 4/2011 | Mogensen | F03D 80/00 410/44 |
| 9,677,543 | B2 | 6/2017 | Kamibayashi | |
| 2003/0200895 | A1 * | 10/2003 | Forbes | B61D 3/18 105/355 |
| 2006/0196147 | A1 * | 9/2006 | Dickey | E04C 2/20 52/782.1 |
| 2007/0044391 | A1 * | 3/2007 | Richardson | E04B 1/34321 52/79.1 |
| 2007/0175108 | A1 * | 8/2007 | Stein | E04B 1/34321 52/79.5 |
| 2010/0307084 | A1 * | 12/2010 | Resso | E04D 3/366 52/302.1 |
| 2011/0142616 | A1 * | 6/2011 | Christensen | F03D 13/10 415/224 |
| 2013/0142664 | A1 | 6/2013 | Kamibayashi et al. | |
| 2013/0259677 | A1 * | 10/2013 | Kamibayashi | F03D 13/10 415/213.1 |

FOREIGN PATENT DOCUMENTS

| | | |
|---|---|---|
| DE | 20205396 U1 | 11/2002 |
| EP | 1101936 A2 | 5/2001 |
| EP | 1134410 A1 | 9/2001 |
| EP | 2317137 A1 | 5/2011 |
| EP | 2322795 A2 | 5/2011 |
| EP | 2375066 A1 | 10/2011 |
| EP | 2428676 A1 | 3/2012 |
| EP | 2466129 A2 | 6/2012 |
| EP | 2636698 A1 | 9/2013 |
| EP | 2691649 A2 | 2/2014 |
| EP | 2840254 A1 | 2/2015 |
| EP | 2942522 A1 | 11/2015 |
| EP | 3002456 A1 | 4/2016 |
| EP | 3126671 A1 | 2/2017 |
| WO | WO 2008006377 A1 | 1/2008 |

OTHER PUBLICATIONS

Non-English Chinese Office Action dated Apr. 9, 2020 for Application No. 201910156629.8.

* cited by examiner

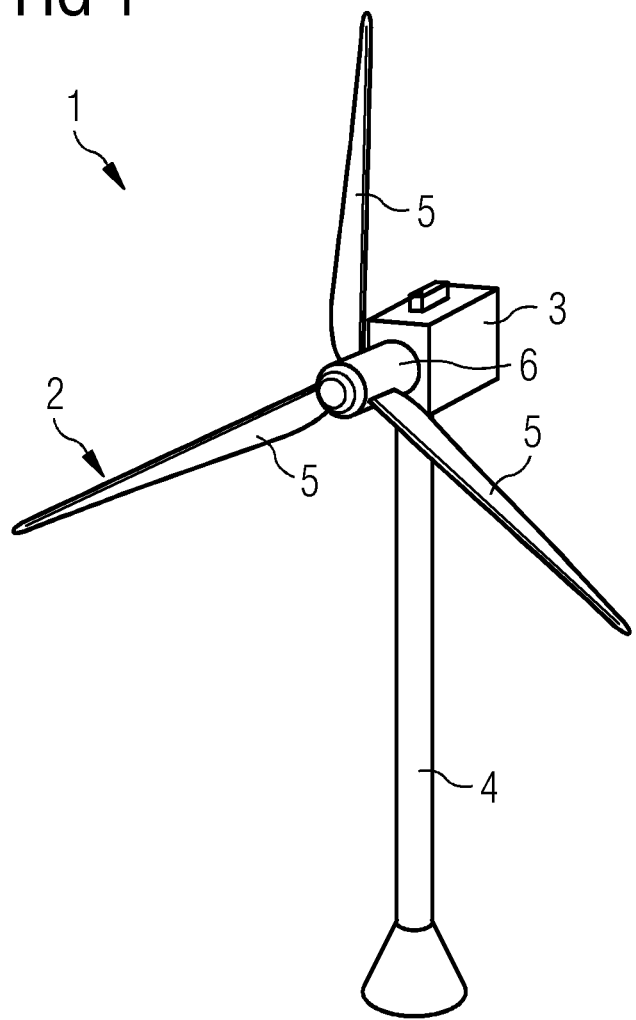
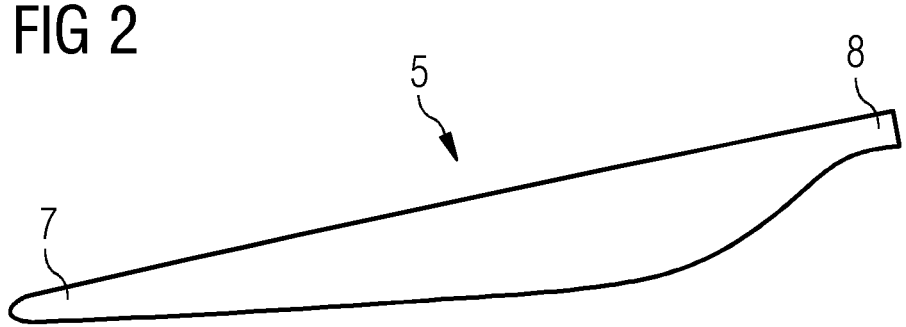

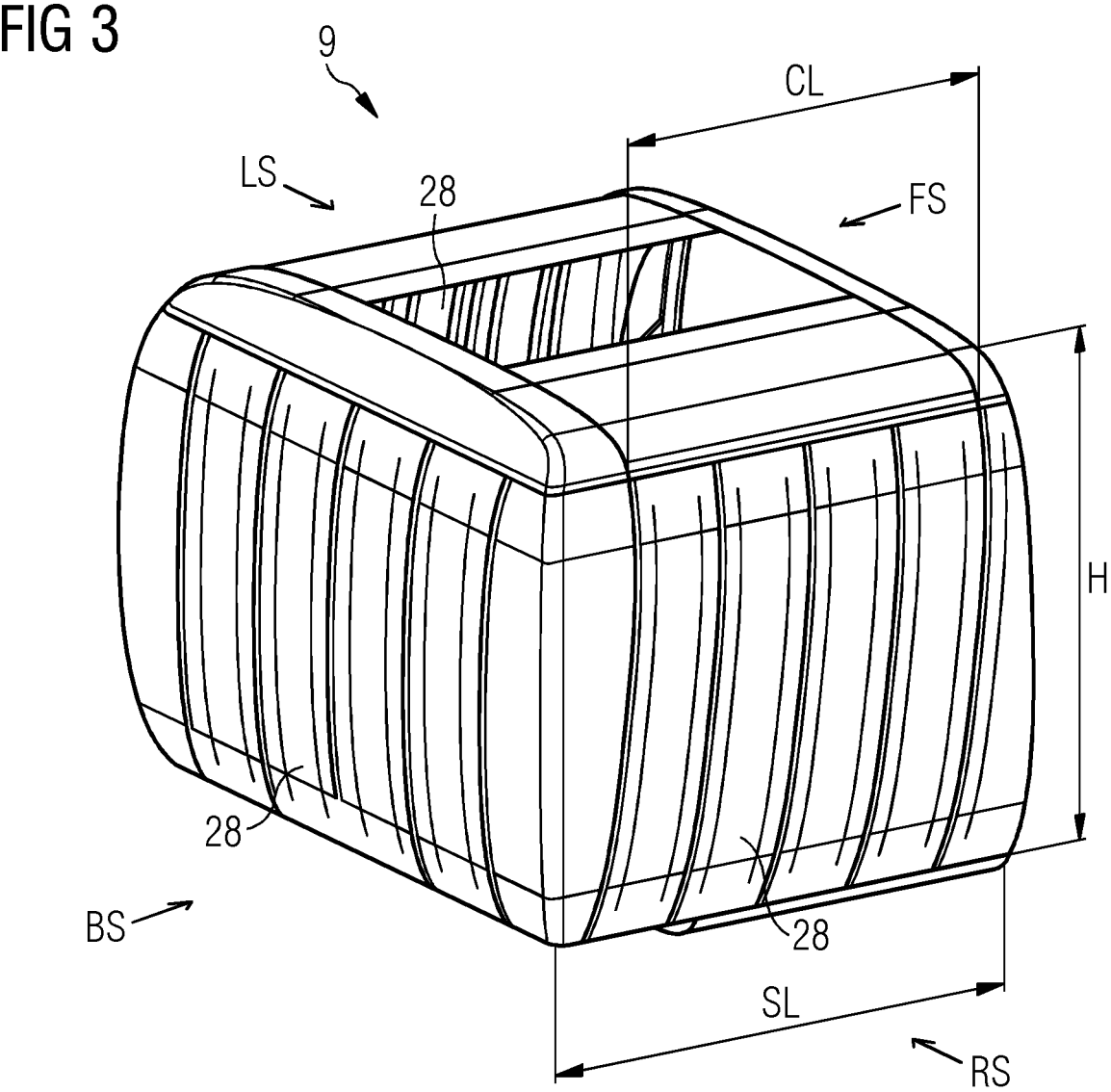

CANOPY STRUCTURE AND A WIND TURBINE

CROSS-REFERENCE TO RELATED APPLICATIONS

This application claims priority to European application No. 18159737.8, having a filing date of Mar. 2, 2018, the entire contents of which are hereby incorporated by reference.

FIELD OF TECHNOLOGY

The following relates to a canopy structure for a nacelle of a wind turbine and to a wind turbine comprising such a canopy structure.

BACKGROUND

As wind turbines get bigger and bigger, the size of the nacelles likewise increases to accommodate the size increasing equipment like generator, gearbox, power electronics or the like. In particular, the weight follows along this trend. Nacelles are usually provided with an outside cover, named as canopy structure, surrounding an interior of the nacelle, wherein the canopy structure is normally prepared from custom-made cover sheets or panels which are attached to a nacelle support structure. As such, the cover sheets are usually not load-carrying but provide some structural stiffness to the nacelle support structure. The canopy structure mainly serves the purpose of shielding the interior of the nacelle from the outside environment.

However, due to the increasing size of the nacelles, either numerous cover sheets need to be prepared which are then placed individually on the outside of the nacelle support structure. This however is very time consuming from a manufacture point of view. Alternatively, bigger cover sheets can be made which however requires large storage facilities before assembly and may not be easy to transport. Either way, the panels are often custom-made for each individual placement in the overall canopy structure layout, which requires individual and labor-intensive preparation procedures, e.g. different molds or cutting tools have to be used before a complete canopy structure is prepared.

EP 2 942 522 A1 describes a wind turbine power generating apparatus comprising a nacelle including a plurality of unit panels and a fastening bolt for connecting the plurality of unit panels with one another.

U.S. Pat. No. 9,677,543 B2 describes a structure for a nacelle cover connection portion of a wind turbine generator including a lengthy first angled member fixed to an inside surface of a nacelle cover and forming an upper end portion of a side wall panel and a lengthy second angled member fixed to the inside surface and forming a lower end portion of a roof panel. An upper surface of the first angled member and a lower surface of the second angled member are aligned with and fixed to each other. A covering portion covering the upper end portion from the outside of a nacelle is provided at a predetermined interval from the same and integral with the lower end portion so as to protrude to the outside of the nacelle cover farther than the lower end portion.

SUMMARY

An aspect relates to an improved canopy structure for a nacelle of a wind turbine.

Accordingly, a canopy structure for a nacelle of a wind turbine is provided. The canopy structure comprises at least one side and a plurality of standard panels which all have the same length and the same width, wherein the at least one side is at least partly formed from the plurality of standard panels, and wherein each standard panel comprises a flange which runs only along one edge of the standard panel.

Advantageously, the canopy structure comprising the standard panels is able to reduce the need of a high number of different canopy parts. The amount of different types of molds or tools for producing the standard panels is reduced which leads to a more cost-effective production of the canopy structure. Lowering of the number of parts simplifies the logistics related to production, transport, storage and assembly. Simple shaped parts like the standard panels and high numbers of identical parts makes transportation more cost-effective. The standard panels can therefore be used to produce canopy structures for a variety of different wind turbine models.

The canopy structure is a nacelle cover or can be named as nacelle cover. Apart from the standard panels, the canopy structure comprises a plurality of custom-made panels. The custom-made panels can comprise bottom panels corner panels and/or topside panels. All panels are attached to each other to form a self-carrying canopy structure. "Self-carrying" in this case means that the panels itself form a load-carrying structure that does not require a heavy metal frame to which the panels are attached. "Standard" or "standardized" in this respect means that all the standard panels have the same three-dimensional geometry, the same dimensions and are made of the same material. In particular, all standard panels are made with the same mold or tool. The standard panels can be made of metal or a composite material. A "plurality" means at least two standard panels. There are more than two standard panels.

The canopy structure comprises a left side, a right side and a backend side. Further, the canopy structure can comprise a front side which is open, a bottom and a topside. A hub of a rotor of the wind turbine is arranged at the front side. The standard panels can also used to produce the bottom and/or the topside of the canopy structure. The standard panel is rectangular, wherein the length of the standard panel is larger than the width. A "flange" is a section of the standard panel that is bent outwards from a basic section thereof. The basic section can be a metal or composite material sheet. The flange running along "only" or "solely" one edge means that the standard panel has a plurality of edges, in particular four, wherein just one of the edges has a flange and the other, in particular three, edges do not have such a flange. The standard panels can be provided with a conductive film layer which is then connected by appropriate means to one another as to create a Faraday cage of the canopy structure for lightning protection.

According to an embodiment, the flange of the standard panel overlaps a neighbored standard panel. In the overlapping section, the standard panels can be bolted and/or glued together.

According to a further embodiment, the flange is bent outwards from a basic section of the standard panel. In particular, the flange is bent perpendicular to the basic section. "Perpendicular" in this case means an angle of 90°±10°, more of 90°±5°, more of 90°±1° and more of exactly 90°.

According to a further embodiment, the flange is bent S-shaped, Z-shaped or L-shaped. "S-shaped" or "Z-shaped" means that the flange has a first section that is bent perpendicular to the basic section and a second section that is bent perpendicular to the first section. "L-shaped" means that the flange is bent perpendicular to the basic section.

According to a further embodiment, the standard panel comprises four edges, wherein three edges of the standard panel are flange-free. "Flange-free" or "flange-less" edges do not have a flange. The standard panel has a first edge, a second edge, a third edge and a fourth edge. The first edge and the third edge run along a length direction of the standard panel. The second edge and the fourth edge run along a width direction of the standard panel. In particular, the first edge runs parallel to the third edge and the second edge runs parallel to the fourth edge. The first edge can be named as first lengthwise edge. The second edge can be named as first widthwise edge. The third edge can be named as second lengthwise edge. The fourth edge can be named as second widthwise edge.

According to a further embodiment, the flange runs only along a lengthwise edge of the standard panel. In particular, the flange runs only along the first lengthwise edge.

According to a further embodiment, the standard panel is curved. Alternatively, the standard panel is straight. Seen from an interior of the canopy structure, the standard panel can be curved outwards (concave) or inwards (convex). When being curved outwards, a space of the interior of the canopy structure is increased.

According to a further embodiment, the standard panel comprises a stiffening rib which runs along a length direction of the standard panel. The rib can either extend outwards or inwards towards the interior of the canopy structure. The rib can be build up as a sandwich construction including fiber materials and foam core materials as part of a panel mold. This will allow the rib to be introduced and produced in the same process of producing the standard panel. This can be named as "one shot solution". The rib can alternatively be build up in an open composite box beam construction and can in turn be attached to an already prepared standard panel.

According to a further embodiment, the canopy structure has a side length, wherein a connected length of the standard panels when being connected to each other makes up at least 60%, more at least 70%, more at least 80% and more at least 90% of the side length. The standard panels together with the custom-made panels make up 100% of the side length.

According to a further embodiment, the width is less than 6 meters, more less than 4 meters, more at least 1 meter and more at least 50 centimeters. This enables an easy transport and handling of the standard panels.

According to a further embodiment, the length is more than 3 meters, more than 5 meters and more than 8 meters. This enables the construction of even very large-sized canopy structures.

According to a further embodiment, the canopy structure further comprises a nacelle skeleton to which the standard panels are attached. The nacelle skeleton connects the standard panels to a nacelle support frame.

According to a further embodiment, the nacelle skeleton comprises at least one interior support beam to which the standard panels are attached. The interior support beam runs parallel to the nacelle support frame. The standard panels are attached to the interior support beam by means of brackets. The standard panels can be arranged vertical, that means perpendicular to the interior support beam, or horizontal, that means parallel to the interior support beam.

According to a further embodiment, the nacelle skeleton comprises a plurality of posts to which the at least one interior support beam is attached, wherein the posts are connected to a nacelle support frame of the nacelle. There can be provided four or more than four posts. The posts can be placed at corners of the nacelle support frame or between the corners. The posts can be straight. Alternatively, the posts can also be bent outwards. The nacelle support frame can be in the form of a rectangular and/or round shaped bedframe, wherein three interior support beams (separate or combined into one single piece) are connected to or rest on the posts.

Additionally, a wind turbine, comprising a nacelle and such a canopy structure is provided. The canopy structure is part of the nacelle. Apart from the canopy structure, the nacelle can comprise the nacelle support frame to which the canopy structure is attached and a generator, a gearbox, electronic devices or the like which are arranged inside the canopy structure. The nacelle is fixed to a tower of the wind turbine. "Wind turbine" presently refers to an apparatus converting the wind's kinetic energy into rotational energy, which may again be converted to electrical energy by the apparatus.

Further possible implementations or alternative solutions of embodiments of the invention also encompass combinations—that are not explicitly mentioned herein—of features described above or below with regard to the embodiments. The person skilled in the art may also add individual or isolated aspects and features to the most basic form of embodiments of the invention.

BRIEF DESCRIPTION

Some of the embodiments will be described in detail, with references to the following Figures, wherein like designations denote like members, wherein:

FIG. 1 shows a perspective view of a wind turbine according to one embodiment;

FIG. 2 shows a perspective view of a wind turbine rotor blade according to one embodiment;

FIG. 3 shows a perspective view of a canopy structure according to one embodiment;

DETAILED DESCRIPTION

Figure 4:
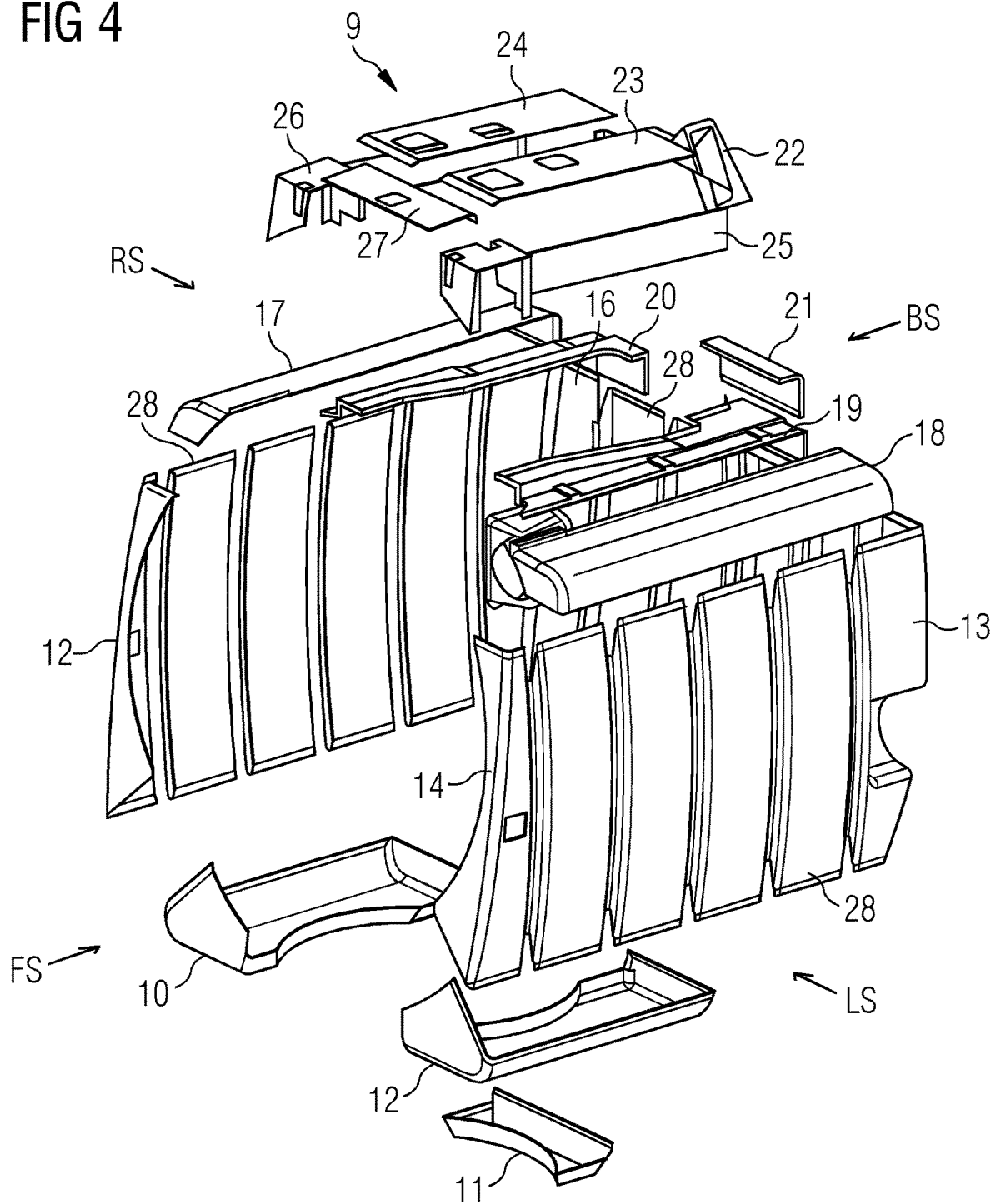
FIG. 4 shows a perspective exploded view of the canopy structure according to FIG. 3.

In the Figures, like reference numerals designate like or functionally equivalent elements, unless otherwise indicated.

FIG. 1 shows a wind turbine 1 according to one embodiment.

The wind turbine 1 comprises a rotor 2 connected to a generator (not shown) arranged inside a nacelle 3. The nacelle 3 is arranged at the upper end of a tower 4 of the wind turbine 1.

The rotor 2 comprises three rotor blades 5. The rotor blades 5 are connected to a hub 6 of the wind turbine 1. Rotors 2 of this kind may have diameters ranging from, for example, 30 to 160 meters or even more. The rotor blades 5 are subjected to high wind loads. At the same time, the rotor blades 5 need to be lightweight. For these reasons, rotor blades 5 in modern wind turbines 1 are manufactured from fiber-reinforced composite materials. Therein, glass fibers are generally preferred over carbon fibers for cost reasons. Oftentimes, glass fibers in the form of unidirectional fiber mats are used.

FIG. 2 shows a rotor blade 5 according to one embodiment.

The rotor blade 5 comprises an aerodynamically designed portion 7, which is shaped for optimum exploitation of the wind energy and a blade root 8 for connecting the rotor blade 5 to the hub 6.

FIG. 3 shows a perspective view of one embodiment of a canopy structure 9 for the nacelle 3. FIG. 4 shows an exploded view of the canopy structure 9.

The canopy structure 9 has a front side FS, where the hub 6 is arranged, a backend side BS, which faces away from the hub 6, a left side LS (seen from within the canopy structure 9 in direction of the hub 6) and a right side RS (seen from within the canopy structure 9 in direction of the hub 6). The canopy structure 9 is part of the nacelle 3. Apart from the canopy structure 9, the nacelle 3 can comprise a generator and/or a gearbox which is arranged inside the canopy structure 9.

The canopy structure 9 comprises a plurality of panels 10 to 27. The panels 10 to 27 can be made of a fiber reinforced plastic or a metal sheet. The panels 10 to 27 are of different size and shape. In particular, the panels 10 to 27 can be custom-made. For example, the panels 13 to 16 can form corners of the canopy structure 9, the panels 10 to 12 can form a bottom of the canopy structure 9, whereas the panels 17 to 27 can form a topside of the canopy structure 9. The panels 13 to 16 can be named as "corner panels". The panels 17 to 27 can be named as "topside panels". The panels 10 to 12 can be named as "bottom panels".

Apart from the panels 10 to 27 is provided a plurality of standard panels 28 of which only three have a reference sign in FIG. 3 and FIG. 4. "Standard" in this case means that all the standard panels 28 have the same size and shape. In FIG. 3, the standard panels 28 are used to constitute most of the left side LS, the right side RS and the backend side BS of the canopy structure 9. However, the standard panels 28 can be used to constitute other parts of the canopy structure 9. The standard panels 28 can be connected to the panels 10 to 27. In FIG. 3 and FIG. 4 the backend side BS, the left side LS and the right side RS each comprise four standard panels 28.

Each standard panel 28 is strengthened as to provide stiffness to the standard panels 28 so that they are load-carrying structures on their own. Optionally the corner panels 13 to 16 can also be identical yet different from the standard panels 28, at least in pairs of two (backend corner panels 13, 16 and/or frontend corner panels 14, 15). However, as outlets from the canopy structure 9 may be placed in these corner panels 13 to 16 and/or because their shape makes them different from one side opposite the other side, they are typically casted individually.

Most of the topside panels 17 to 27 to may also be identical to the standard panels 28, but as hatches or other openings are typically placed on top of the canopy structure 9, they may also be casted individually. In addition, a length L (FIG. 5) of the standard panels 28 when placed on the backend side BS, the left side LS and/or the right side RS may provide a certain height H of the canopy structure 9 that is chosen to be different from a required width of the canopy structure 9. Accordingly, a length of these standardized topside panels 17 to 27 may be of different dimension. Nonetheless, the top panels 17 to 27 may therefore represent a second set of standard panels, being independent of the standard panels 28.

Similar, the bottom panels 10 to 12 are typically different from the standard panels 28 as they have to be placed at least in part around the tower 4 carrying the nacelle 3 and thus need also to be casted individually. Likewise, the frontend corner panels 14, 15 are different due to the hub 6 with the rotor 2 being attached to the nacelle 3.

Figure 5:
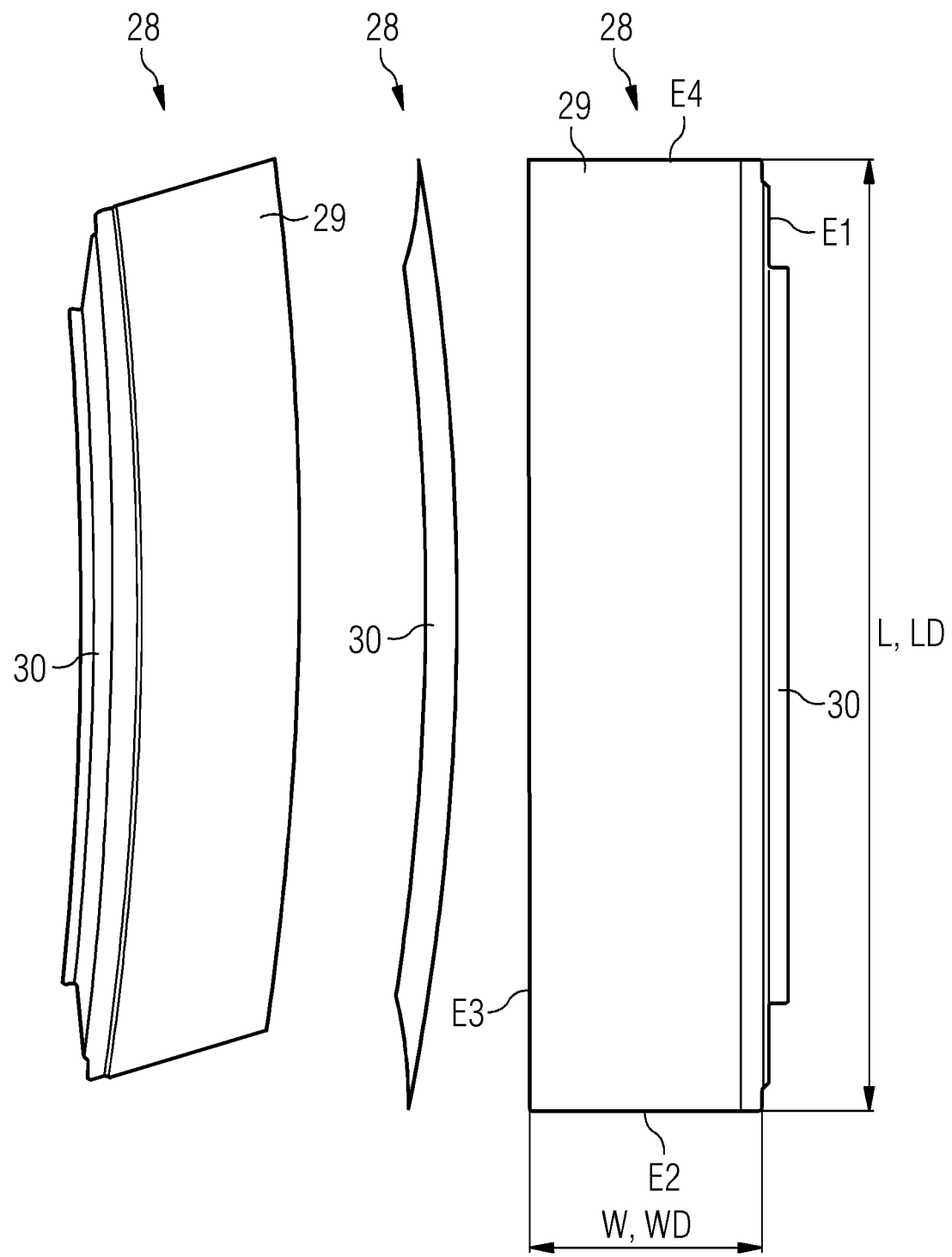
FIG. 5 shows different views of a standard panel according to one embodiment.

FIG. 5 shows (from left to right) a perspective view, a side view and a front view of a standard panel 28.

The standard panels 28 are all concave in shape (extending outwards when seen from an interior of the canopy structure 9). They may however also extend inwards. However, the outward concavity provides additional volume to the overall interior space available in the canopy structure 9. Regardless of shape, the standard panels 28 are connected to one another so that they provide an essentially closed structure that protects the interior of the canopy structure 9 from an outside environment.

To achieve this, the standard panels 28 may be glued or bolted together. Optionally, there can be a sealing in between joints of the standard panels 28. The standard panels 28 can be detachably attached to one another for individual service/replacement purposes. In turn, all openings of the complete canopy structure 9 (e.g. doors/hatches when closed) and interfaces towards rotor 2 and tower 4 are also sealed so that the interior of the canopy structure 9 is (more or less) completely sealed from the outside environment. Thus, at an interface between given standard panels 28 and a relatively moving part considering the canopy structure 9 as a static structure, such interface comprises a flexible sealing.

The number of standard panels 28 on each side RS, LS, BS depends on the desired dimensions of the canopy structure 9 and a width W of the standard panels 28. In addition, the number of standard panels 28 on the right side RS and the left side LS may be different from the number of standard panels 28 at the backend side BS. Nonetheless, for a given side length SL (FIG. 3) of the canopy structure 9, a connected length CL (FIG. 3) of the standard panels 28 (when being connected to one another) makes up at least 70% of the side length SL and more more than 80% of the side length SL.

As can be seen in FIG. 5, each standard panel 28 comprises a basic section 29 which is curved and at least one flange 30 which faces inwards. The flange 30 serves two purposes, namely to act as a stiffener e.g. for wind loads or in support of any load arising from placement of structures on top of the canopy structure 9 and optionally to act as a simple means of connecting the standard panels 28 to each other.

As FIG. 5 (right side) shows, the standard panel 28 has a first edge E1, a second edge E2, a third edge E3 and a fourth edge E4. The standard panel is rectangular. The first edge E1 and the third edge E3 run along a length direction LD of the standard panel 28. The length L is measured in the length direction LD. The second edge E2 and the fourth edge E4 run along a width direction WD of the standard panel 28. The width W is measured in the width direction WD. The first edge E1 runs parallel to the third edge E3 and the second edge E2 runs parallel to the fourth edge E4. The first edge E1 can be named as first lengthwise edge. The second edge E2 can be named as first widthwise edge. The third edge E3 can be named as second lengthwise edge. The fourth edge E4 can be named as second widthwise edge. As can be seen from FIG. 5, the flange 30 runs solely or only along the first lengthwise edge E1. Alternatively, the flange 30 can run along the second lengthwise edge E3. The flange 30 can also run along one of the widthwise edges E2, E4.

Figure 6:
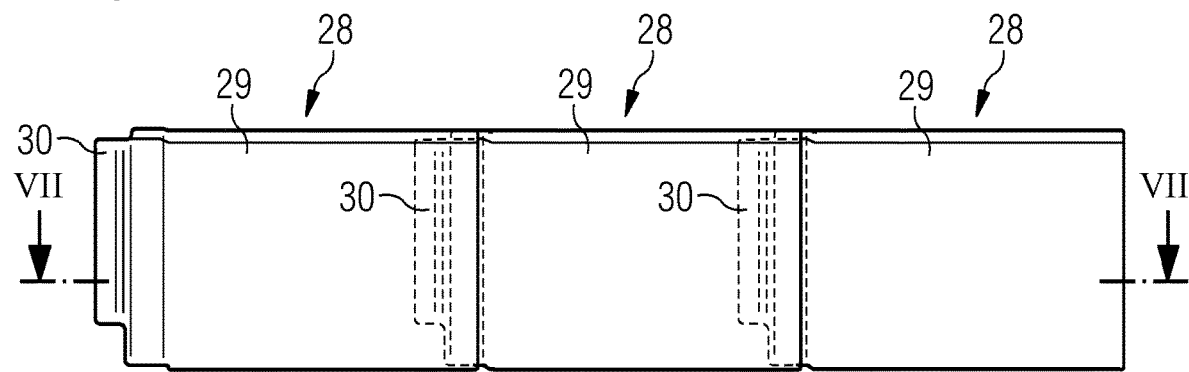
FIG. 6 shows a view of a plurality of standard panels according to FIG. 5.
Figure 7:
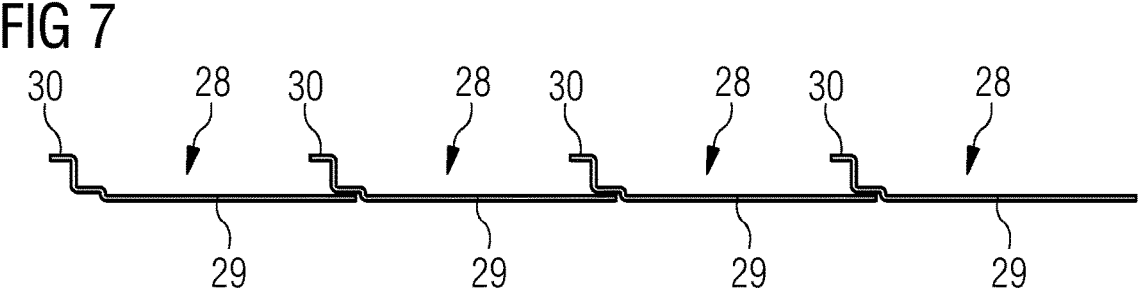
FIG. 7 shows a cross-sectional view according to intersection line VII-VII in FIG. 6.
Figure 8:
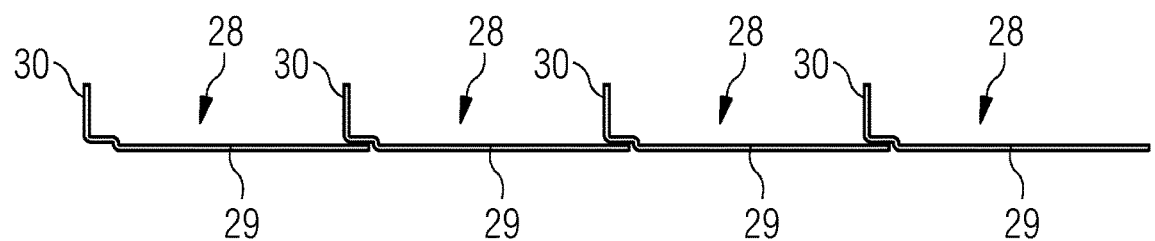
FIG. 8 shows a further cross-sectional view according to intersection line VII-VII in FIG. 6.

FIG. 6 shows a view of a plurality of standard panels 28 overlapping each other. FIG. 7 shows a sectional view according to intersection line VII-VII. FIG. 8 shows a sectional view of an alternative embodiment of the standard panels 28.

The flanges 30 of the standard panels 28 comprise an S-shaped or Z-shaped bend (FIG. 7) at one end lengthwise the standard panel 28, so that the standard panels 28 can overlap one another as illustrated in FIG. 6 and FIG. 7. In alternative embodiment (FIG. 8), the standard panels 28 may have a simplified profile i.e. an L-shaped profile. The standard panels 28 may in addition be connected to one another at this overlapping section (e.g. bolted or glued together). In addition, the flanges 30 are bended (e.g. to 90°) at their ends as to allow attachment of the standard panels 28 to a support beam/strut of a main nacelle support, e.g. via a bracket connecting the two structures.

Any other panels 10 to 27 used to provide the full canopy structure 9 may also comprise such a S-shaped flange 30 so that they too overlap and are able to "mate" with the standard panels 28. Since all the panels 10 to 28 used to make a complete canopy structure 9 are attached to one another, the canopy structure 9 can in principle be directly attached only via the bottom panels 10 to 12 to a yaw arrangement (i.e. to a yaw bearing) of the wind turbine 1 and thus be carried only via this attachment point and follow a yaw movement of the wind turbine 1.

In accordance with the design of the standard panels 28 and their ability to function as load-carrying element, two, three, four or more standard panels 28 are provided on each of the left side LS, right side RS and backend side BS to provide sufficient strength and ability to withstand the foreseen loads to the canopy structure 9 and in particular loads arising from any structures/items placed on top of the canopy structure 9 (e.g. a helipad).

As mentioned before, at any given side LS, RS, BS of the canopy structure 9, the standard panels 28 are connected directly to one another and thus represent a continuous outer surface of the canopy structure 9. However, and in alternative, "non-standard" panels of varying width may be placed in between the standard panels 28 at different sequence. This option provides a flexible solution to easily adjust the side length SL for example.

The length L of the standard panels 28 can be chosen to meet the requirement of a given wind turbine model, but the standard panels 28 are longer than 3 meters, more longer than 5 meters, and may even be longer than 8 meters to meet the requirements of very large wind turbine nacelles.

The width W of the standard panels 28 is likewise chosen to meet the requirement of a given wind turbine model. However, for ease of handling, the width W is less than 6 meters and less than 4 meters. In order for ease of installation (i.e. the more standard panels 28 that will make up a side LS, RS, BS, the more time consuming this task may be), a minimum size of the width W is 50 cm or more at least 1 meter.

Nonetheless, the dimensions of the standard panels 28 are chosen so that they can be easily transported by road or railway e.g. to meet local maximum size transport requirements and even so that the standard panels 28 can be stored in standard sized containers, e.g. for sea transport. These size requirements are applicable to both stacks of multiple standard panels 28 or individual standard panels 28 as well as to any other of the panels 10 to 27 to make a complete canopy structure 9.

A thickness of the standard panels 28 depends on the material chosen and may be constant over the entire standard panel 28 but can also vary across the length direction LD and a spanwise direction (width direction WD). The standard panels 28 are provided in full length of the intended height H (FIG. 3) of the canopy structure 9, but individual panels can also be casted as two or more pieces and preassembled before placement. Nonetheless, the standard panels 28 are made as "single pieces" in the sense that they are molded casted as a single piece structure including being shaped from a single sheet of material e.g. a single plate of a given material being shaped into the desired form and dimension.

Materials that are suitable for the panels 10 to 28 include fiber fabrics such as glass, aramid, carbon and natural fibers and/or resin such as polyesters, vinyl esters, or epoxies. Nonetheless, metal standard panels 28 can also be used. The panels 10 to 28 can be provided with a conductive film layer (integrated or placed on a surface) which is then connected by appropriate means to one another as to create a Faraday cage of the nacelle 3 for lightning protection.

Figure 9:
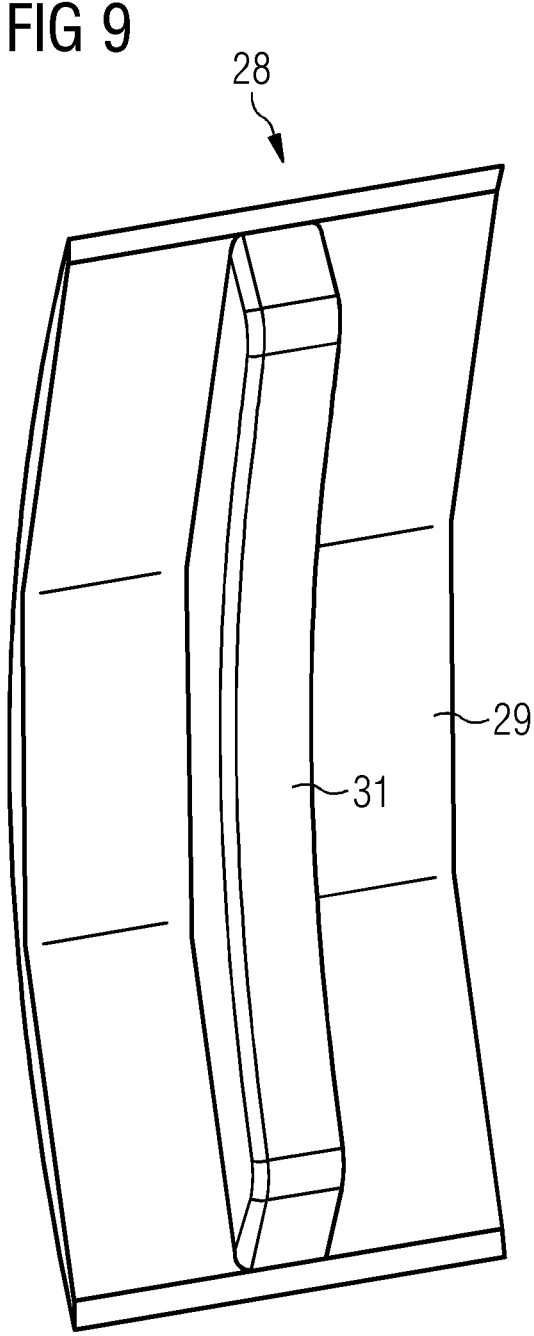
FIG. 9 shows a perspective view of a standard panel according to one embodiment.

FIG. 9 shows a perspective view of an alternative embodiment of a standard panel 28.

In this embodiment of the standard panel 28, the stiffening characteristic is not provided by a flange 30 but by a rib 31 placed within the basic section 29 or at a side of the basic section 29. The rib 31 can either extend outwards or inwards towards the interior of the canopy structure 9. The rib 31 can be build up as a sandwich construction including fiber materials and foam core materials as part of a panel mold. This will allow the rib 31 to be introduced and produced in the same process of producing the standard panel 28. This can be named as "one shot solution". The rib 31 can alternatively be built up in an open composite box beam construction and can in turn be attached to an already prepared standard panel 28. Accordingly, the rib 31 can be seen as an integrated part of the standard panel 28 (i.e. a one-piece panel) or as a separate piece attached to the standard panel 28, wherein the rib 31 itself can be hollow on the inside or a solid structure. Additionally, each standard panel 28 can have both, a flange 30 and a rib 31.

Figure 10:
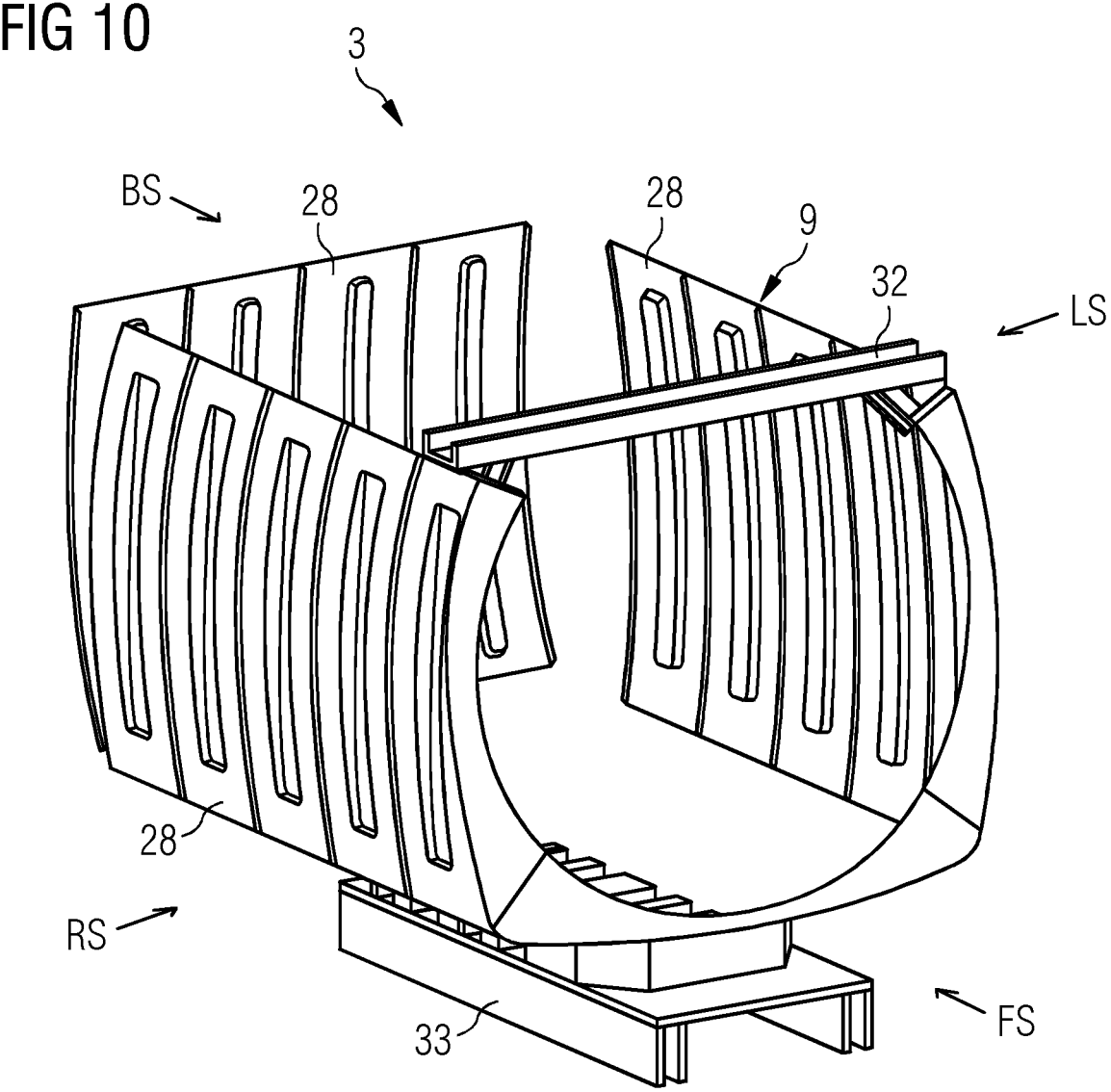
FIG. 10 shows a perspective exploded view of a nacelle according to one embodiment.

FIG. 10 shows a perspective exploded view of the nacelle 3 including the canopy structure 9.

The standard panels 28 can be at least be attached to an interior support structure 32 that in turn is connected to a nacelle support frame 33. The nacelle support frame 33 supports bearing housings, a generator, a gearbox, power electronics, service access ways or the like. This arrangement according to FIG. 10 may provide additional support to the canopy structure 9 and makes placement of the standard panels 28 during preassembly easier, especially if this interior support structure 32 is firmly attached to the nacelle support frame 33. The interior support structure 32 can have the form of a rectangular frame made of beams, e.g. aluminum, steel or fiber composite beams. The interior support structure 32 is part of the canopy structure 9.

Figure 11:
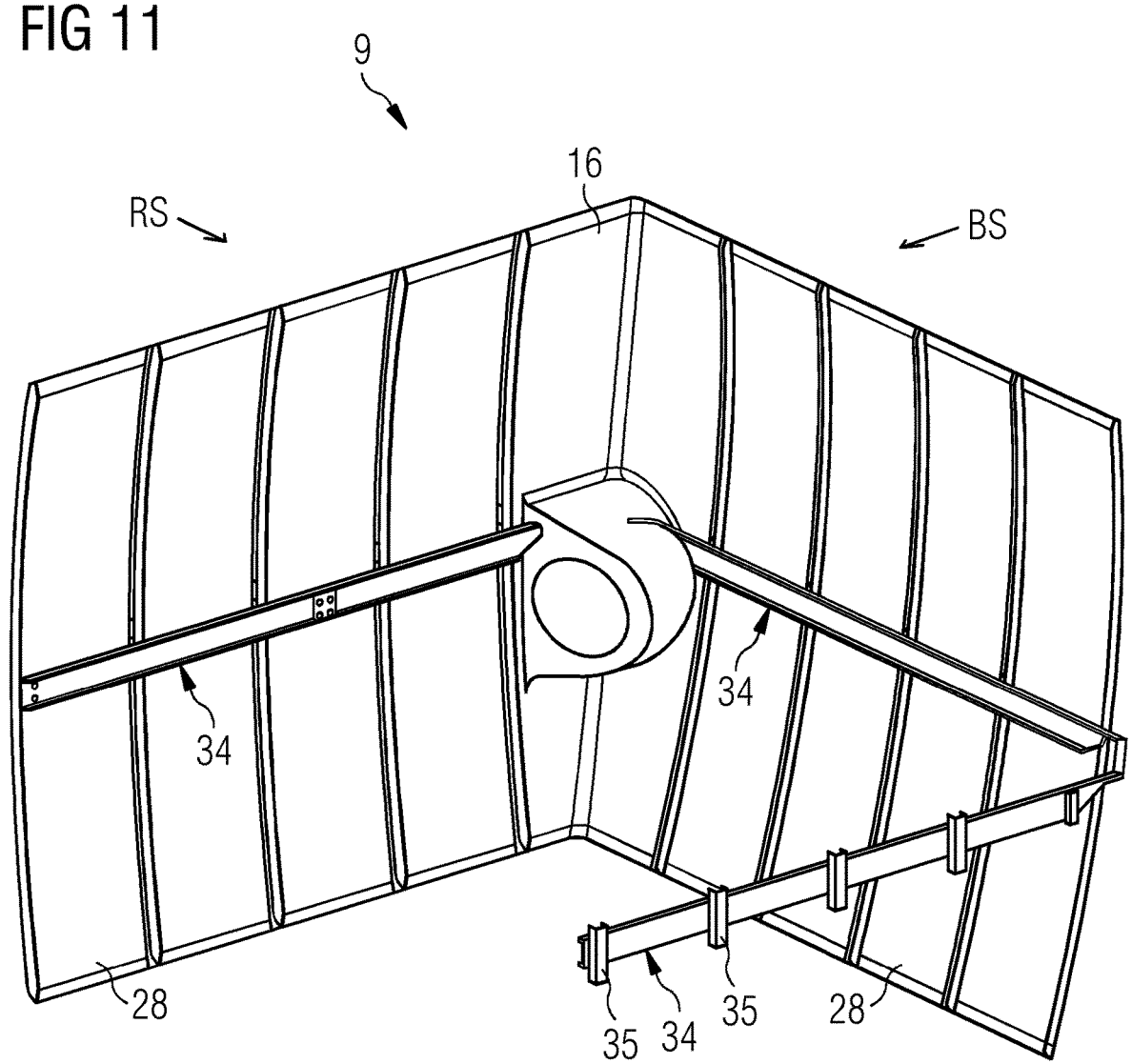
FIG. 11 shows a perspective view of a canopy structure according to one embodiment.
Figure 12:
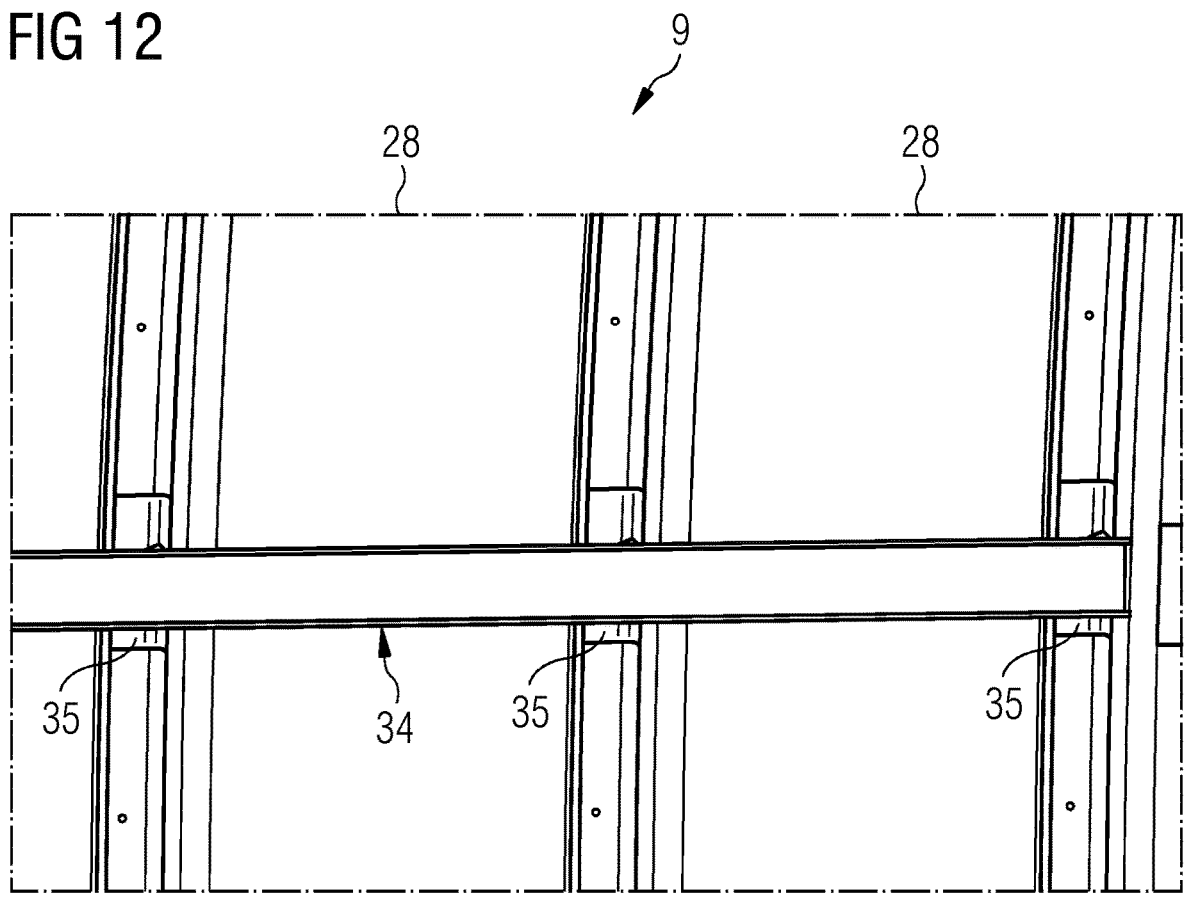
FIG. 12 shows an enlarged view of the canopy structure according to FIG. 11.

FIG. 11 and FIG. 12 both show partial views of the canopy structure 9.

The interior support structure 32 can comprise at least one interior support beam 34 which can be arranged horizontally. There can be provided a plurality of interior support beams 34. The standard panels 28 and the corner panels 13 to 16 are attached individually via brackets 35 to one or more interior support beams 34. The interior support beam 34 is placed in the interior of the canopy structure 9 along the sides RS, LS, BS of the canopy structure 9. Said interior support beam 34 can optionally be directly or indirectly connected to the nacelle support frame 33.

As mentioned before, the standard panels 28 are of such a strength that they minimize the need for a compete nacelle skeleton as normally used in known nacelle layouts to carry the canopy structure 9. In this respect, such skeleton may be seen as being integrated into the standard panels 28 and optionally also the corner panels 13 to 16.

Figure 13:
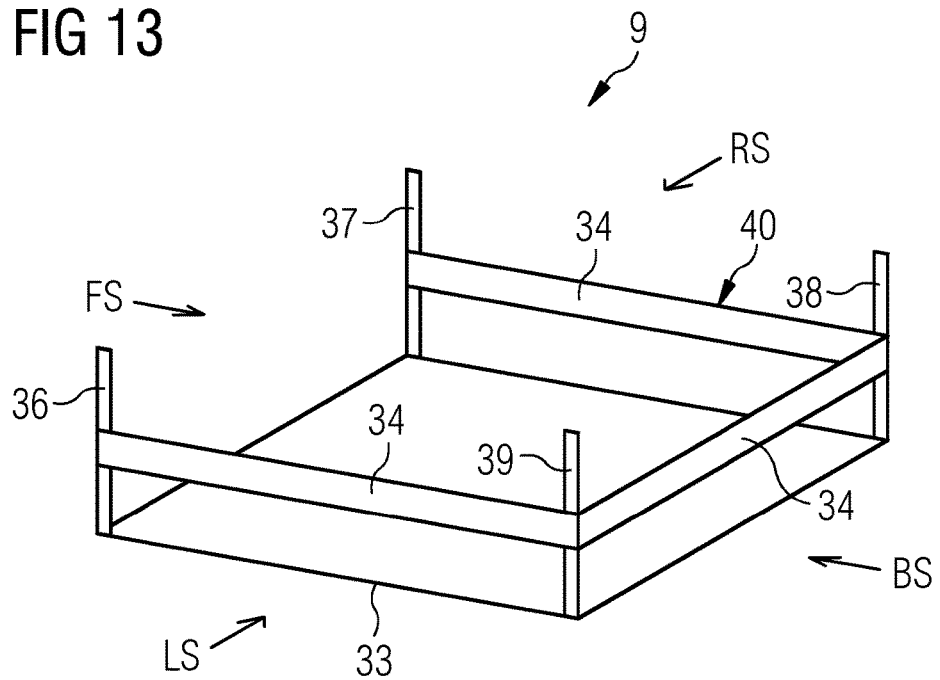
FIG. 13 shows a perspective view of a canopy structure according to one embodiment.
Figure 14:
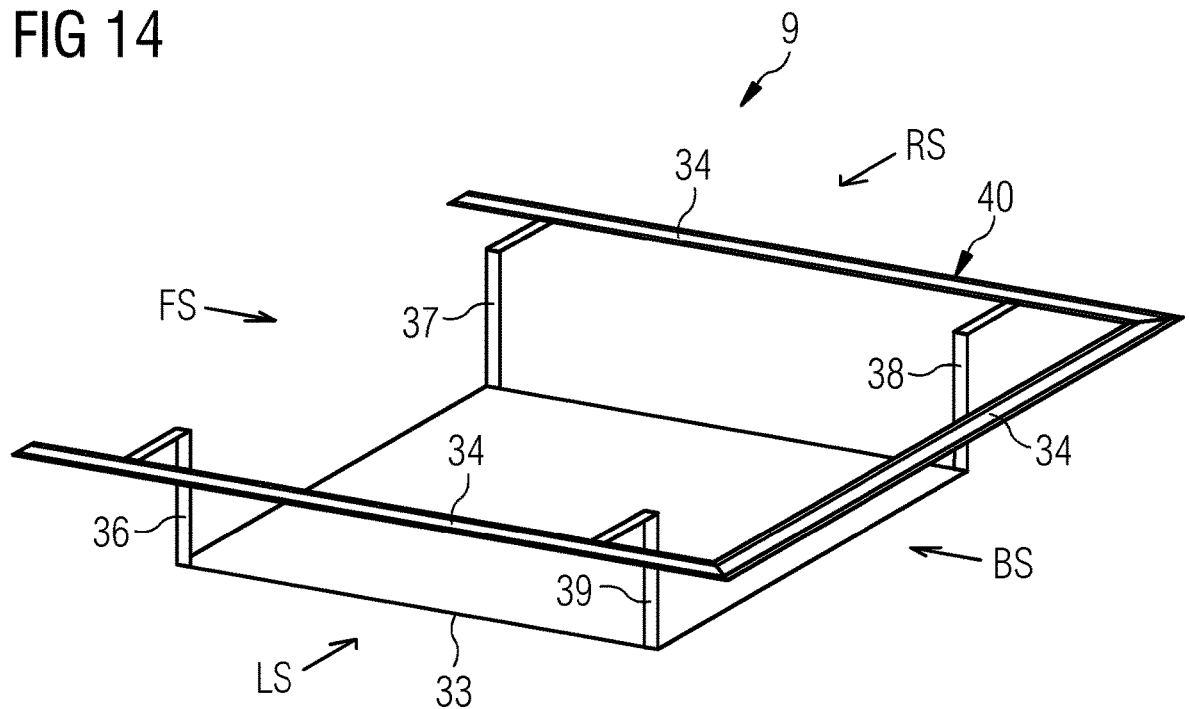
FIG. 14 shows a perspective view of a canopy structure according to one embodiment.

FIG. 13 and FIG. 14 show perspective views of two different embodiments of the canopy structure 9.

As can be seen from FIG. 13, the interior support beam 34 is connected to the nacelle support frame 33 by means of posts 36 to 39. There can be provided four or more than four posts 36 to 39. The posts 36 to 39 can be placed at corners of the nacelle support frame 33 or between the corners. The posts 36 to 39 can be straight. As can be seen from FIG. 14, the posts 36 to 39 can also be bent outwards. The nacelle support frame 33 can be in the form of a rectangular and/or round shaped bedframe, wherein three interior support beams 34 (separate or combined into one single piece) are connected to or rest on the posts 36 to 39. The posts 36 to 39 together with the interior support beam 34 constitutes an optimized nacelle skeleton 40. "Optimized" in this case means that the nacelle skeleton 40 has less parts and is much lighter that known nacelle skeletons in form of a metal cage or frame. The nacelle skeleton 40 can comprise the interior support structure 32.

In another alternative embodiment, the standard panels 28 can be positioned in a horizontal direction (opposed to vertical direction as previously described). A combination of the two ways may also be applicable, i.e. left side LS and right side RS in one direction (e.g. vertical) and backend side BS in other direction (i.e. horizontal).

In the afore-mentioned case, the nacelle skeleton 40 also needs to be adapted to this horizontal placement of the standard panels 28. However, the nacelle skeleton 40 could in principle be a set of posts 36 to 39 as shown in FIG. 13 for example, wherein the standard panels 28 individually are attached directly, or indirectly via a connection to a corner panel 13 to 16 which in turn is attached to a post 36 to 39.

In summary, the canopy structure 9 comprising the standard panels 28 is able to reduce the need of a high number of different canopy parts and has the following advantages. The amount of different types of molds or tools is reduced which leads to a more cost-effective production of the canopy structure 9. Lowering of the number of parts simplifies the logistics related to production, transport, storage and assembly. Simple shaped parts like the standard panels 28 and high numbers of identical parts makes transportation more cost-effective. Higher volumes of the same parts allow higher level of production giving better end-quality and price. One type of standard panel 28 is used for both sides RS, LS and backend side BS of the canopy structure 9. Each standard panel 28 includes the flange 30 facing inwards, serving two purposes, namely to act as a stiffener e.g. for wind and weight loads and to act as a simple connection (canopy connection) to a main nacelle structure, e.g. to the nacelle support frame 33. The standard panel 28 allows a simple panel design with non-complex attachment points to the main structure of the nacelle 3.

Further, an assembly of preassemblies (i.e. left side LS, right side RS and backend side BS) is made possible using only one type of standard panel 28. Preassembly can be done by using glue or bolts or both. The design concept is based on a self-carrying construction of the canopy structure 9 with point connections to the nacelle support frame 33. The design concept does not rely on a complete, complex and heavy internal steel frame construction to carry/support each individual panel 10 to 28. All special functions (skylights, outlets e.g. drainage holes and lightning protection receivers, etc.) are placed in custom made panels such as corner panels 13 to 16, bottom panels 10 to 12 or topside panels 17 to 27. In alternative, these functionalities can be placed and function via holes drilled, cut or sawed into a standard panel 28.

In particular, the standard panels 28 are made of sufficient strength that they provide support to the nacelle 3 and minimizes the need for heavy steel structures to carry loads from e.g. equipment placed on top of the nacelle 3 such as meteorological equipment, landing platforms (heli-pad, heli-hoist or helicopter platform) and/or intermediate parts to be transferred into the nacelle 3 or used for other parts of the wind turbine 1. This is especially advantageous as it reduces, if not even removes, the need for a structural framework within the canopy structure 9 normally comprising supporting diagonal and/or transverse struts.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A canopy structure for a nacelle of a wind turbine, comprising:
   at least one side; and
   a plurality of standard panels having a same length and a same width;
   wherein a portion of the at least one side formed from the plurality of standard panels, and each standard panel comprises a flange which runs only along one lengthwise edge of the standard panel;
   wherein the flange extends vertically in a lengthwise direction along the one lengthwise edge of the standard panel;
   wherein a front face of the flange is offset from a front face of the standard panel to mate with a portion of a rear face of a neighboring standard panel.

2. The canopy structure according to claim 1, wherein the flange of the standard panel overlaps the neighboring standard panel.

3. The canopy structure according to claim 1, wherein the flange is bent outwards from a basic section of the standard panel.

4. The canopy structure according to according to claim 1, wherein the flange is bent S-shaped, Z-shaped, or L-shaped.

5. The canopy structure according to claim 1, wherein the standard panel comprises four edges, and wherein three edges of the standard panel are flange-free.

6. The canopy structure according to claim 1, wherein the standard panel is curved.

7. The canopy structure according to claim 1, wherein the standard panel comprises a stiffening rib which runs along a length direction of the standard panel.

8. The canopy structure according to claim 1, wherein the canopy structure has a side length, and wherein a connected length of the standard panels when being connected to each other makes up at least 60% of the side length.

9. The canopy structure according to claim 1, wherein the width is less than 6 meters, and at least 1 meter.

10. The canopy structure according to claim 1, wherein the length is more than 3 meters.

11. The canopy structure according to claim 1, further comprising a nacelle skeleton to which the plurality of standard panels are attached.

12. The canopy structure according to claim 11, wherein the nacelle skeleton comprises at least one interior support beam to which the plurality of standard panels are attached.

13. The canopy structure according to claim 12, wherein the nacelle skeleton comprises a plurality of posts to which the at least one interior support beam is attached, and wherein the plurality of posts are connected to a nacelle support frame of the nacelle.

14. A wind turbine comprising a nacelle and the canopy structure according to claim 1.

* * * * *